United States Patent [19]

Rodgers

[11] 4,289,927

[45] Sep. 15, 1981

[54] GRAPHIC COMMUNICATION APPARATUS

[75] Inventor: James L. Rodgers, Tempe, Ariz.

[73] Assignee: Kurta Corporation, Tempe, Ariz.

[21] Appl. No.: 93,620

[22] Filed: Nov. 13, 1979

[51] Int. Cl.³ .............................................. G08C 21/00
[52] U.S. Cl. ..................................................... 178/19
[58] Field of Search ................................... 178/18, 19; 340/146.3 SY, 347 AD; 33/1 M

[56] References Cited

U.S. PATENT DOCUMENTS

4,088,842  5/1978  Ikedo ..................................... 178/19
4,185,165  1/1980  Fencl ..................................... 178/19

Primary Examiner—Thomas A. Robinson
Attorney, Agent, or Firm—H. Gordon Shields

[57] ABSTRACT

Graphic communication apparatus for electronically writing information and transmitting includes a pen having a pair of windings disposed in a predetermined angular relation with respect to each other, and a writing surface having a plurality of windings arranged substantially parallel to each other for sensing the presence of the pen from the magnetic fields of the pen coils to provide differential outputs over the writing surface with respect to the windings of the pen apparatus, and the differential outputs being located with respect to the writing surface in an X—Y orientation.

20 Claims, 20 Drawing Figures

GRAPHIC COMMUNICATION APPARATUS

BACKGROUND OF THE INVENTION

1. Field of the Invention

This invention relates to graphic communications, and, more particularly, to the sensing of a pen location and the transmission of graphic information sensed by a writing surface over which the pen is moved.

2. Description of the Prior Art

U.S. Pat. No. 3,767,858, by the same inventor as the present invention, discloses apparatus for converting the mechanical position of a pen into electrical signals for graphic communications purposes. The phase shifting of input signals to conductors in a grid of a writing table as a pen moves over the grid is sensed by the pen apparatus.

A phase shifting technique, using a phase locked loop, is also employed by the apparatus in U.S. Pat. No. 3,851,097, also by the same inventor as the present apparatus.

U.S. Pat. No. 3,886,311, by the same inventor as the present invention, discloses a pen and a sensor table for graphic communications which utilizes a pen capacitively coupled to an electrostatic field of the sensor table for sensing the location of the pen relative to the electrostatic field. The position of the pen is determined in terms of X and Y coordinates. The pen includes an element to detect the output of the electrostatic field and to provide an output signal in response thereto.

U.S. Pat. No. 3,904,822 describes a graphic communication system which includes a pen movable over a writing surface having a grid comprising X and Y conductors and a pickup coil in the pen inductively coupled to the X and Y conductors. The X and Y conductors cause a voltage to be generated in the pickup coil of the pen. The X and Y conductors in the table are sequentially pulsed so that the position of the pen or its pickup coil are determinable in a time relationship with respect to the pulsing of the X and Y conductors.

U.S. Pat. No. 3,983,222, the inventor of which is also the inventor of the present invention, describes another system for graphic communications in which a table includes an X and Y grid with phase displaced signals resulting from resistors in the X and Y conductors of the grid system. The grid results in an electrostatic field which is sensed by a pickup element in the pen as it moves over the grid. Since the phase shifting is in a predetermined manner, the signal detected by the pen results in a correlation between the location of the signal sensed by the pen and the electrostatic field generated by the X and Y conductors in accordance with the known phase and frequency of the signal from the X and Y conductors at a particular time.

U.S. Pat. No. 4,022,971, also by the same inventor as the present invention, discloses another graphic communication system also having X and Y conductors which generate an electric field and the field is sensed by the pen through a phase shifting system which differs from the phase shifting system of the patent described in the preceding paragraph. In the U.S. Pat. No. 4,022,971 patent, the X and Y conductor grid includes a central zero degree conductor, with conductors on either side of the zero degree conductor being displaced in phase. The dynamic range of the surface is limited to small incremental areas by multiplexing circuitry.

SUMMARY OF THE INVENTION

The invention described and claimed herein comprises apparatus and method which converts the position of a pen on a writing surface into signal outputs that are representative of the pen location by the magnetic coupling of coils, which coils represent the coils of a transformer, with coils of the pen comprising one side of the transformer, and coils disposed on the writing surface comprising the other side of the transformer. The transformer coils or elements, both in the pen and in the writing surface, are wound in a particular manner to effect a desired signal transfer that will provide a pattern having a different output signal from different positions of the pen over the writing surface.

Among the objects of the present invention are the following:

To provide new and useful graphic communication apparatus;

To provide new and useful graphic communication apparatus for sensing a pen location over a writing surface;

To provide new and useful graphic communication apparatus utilizing a transformer coupling;

To provide new and useful graphic writing apparatus having a plurality of coils in a pen movable over a writing surface also having a plurality of coils;

To provide new and useful graphic communication apparatus in which input signals to a pen are coupled to output coils of the writing surface; and To provide new and useful apparatus for detecting the location of a pen relative to a writing surface by adding and subtracting outputs of coils coupled to a writing surface over which a pen is movable and which provides an output signal detected by the coils of the writing surface.

Figure 1:
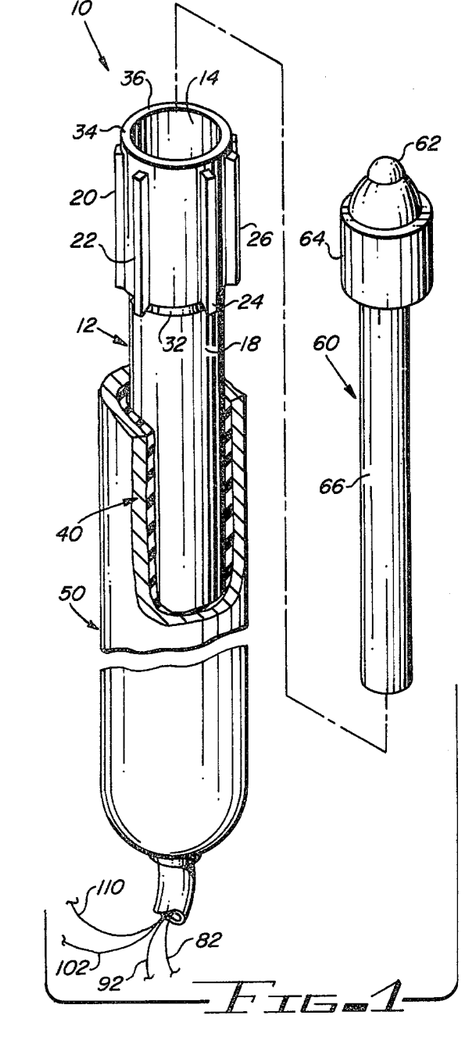
FIG. 1 comprises a perspective view, with portions broken away and in partial section, of a writing pen included in the apparatus of the present invention.
Figure 2:
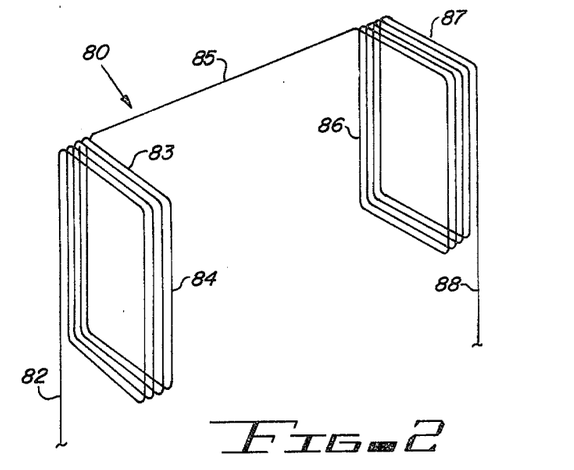
FIG. 2 comprises a schematic illustration of a coil utilized with the apparatus of FIG. 1.
Figure 3:
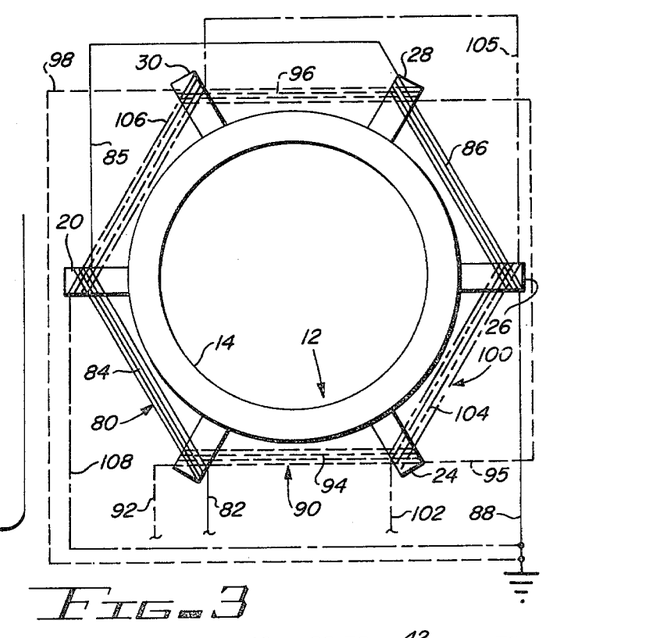
FIG. 3 comprises a schematic illustration of the coils wound with the apparatus of FIG. 1.
Figure 4:
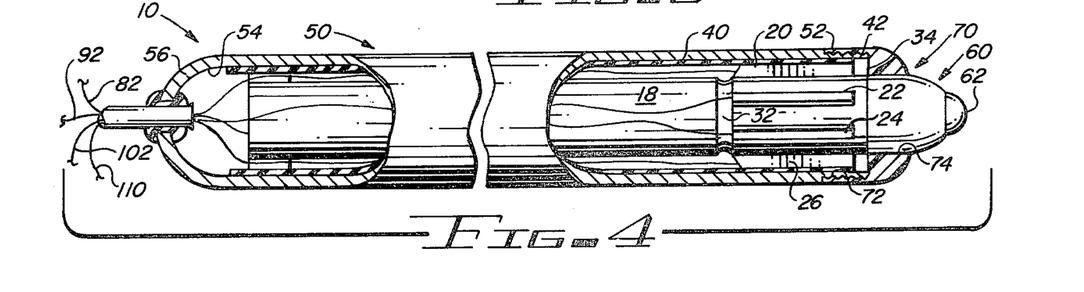
FIG. 4 comprises a view in the assembled pen apparatus of FIG. 1, with portions broken away and in partial section illustrating the assembled pen.

FIGS. 1, 2, 3, and 4 pertain to a pen apparatus 10 employed with the graphic communication apparatus of the present invention. FIG. 1 comprises a perspective view of the pen apparatus 10, partly broken away, to show an outer cylinder or housing 50 and an inner cylinder 12 disposed therein. A cartridge 60 is spaced apart from the cylinders 50 and 12. The pen apparatus 10 includes a plurality of coils 80, 90, and 100, which are best shown in FIG. 3. FIG. 3 comprises a schematic illustration of the coils 80 . . . 100 wound about the inner cylinder 12. FIG. 2 comprises a schematic illustration of the coil 80, separated into two portions. FIG. 4 comprises a view in partial section of the assembled pen apparatus 10. For the following description of the pen apparatus 10, reference will be made primarily to FIGS. 1,2,3, and 4.

The pen 10 is shown inverted in FIG. 1 to show clearly the components associated with its lower, or active, writing portion. The following description of the pen will refer to it in its normal writing orientation, as opposed to the inverted orientation shown in FIG. 1.

The pen apparatus 10 includes the outer cylinder or housing 50, with the inner cylinder 12 disposed therein. The cylinder 12 includes an axially extending bore 14. An enlarged lower portion 64 of the pen cartridge 60 is disposed in the lower part of the bore 14 to provide lateral stability for the pen cartridge. The cartridge 60 moves vertically, as will be discussed below. The inner cylinder 12 comprises a coil form on which the coils 80, 90, and 100 are wound generally parallel to the longitudinal axes of the inner and outer cylinders.

On the outside of the inner cylinder 12 is a cylindrical exterior surface 18, with a plurality of splines 20, 22, 24, 26, 28, and 30 extending generally axially along the longitudinal length of the outer surface 18, and outwardly therefrom. The axial length of the splines 20 . . . 30 is relatively short, as compared to the overall length of the cylinder 12. Above the splines is a circumferentially extending groove 32, and below the splines is a relatively short lower cylindrical portion 34, which is generally of the same exterior diameter as the exterior of the cylinder 12 except for the groove 32 and the splines 20 . . . 30. The lower cylindrical portion 34 terminates in a bottom face 36 of the cylinder 12.

The splines 20 . . . 30 comprise forms over which, and around which, the coils 80, 90, and 100 are wound, as shown best in FIGS. 2 and 3. Each of the coils 80, 90, and 100 includes an input conductor and two coil halves separated physically from each other but connected together by a conductor. Both halves are wound in the same direction, and accordingly their fields do not electrically subtract from each other and accordingly do not cancel each other out. The three coils also include return conductors, and the three return conductors are secured together to a single return conductor 110. Each coil half is parallel to its mate, and the three total coils are offset from each other and overlapping, as again best shown in FIG. 3.

Coil 80, schematically shown in FIG. 2, includes an input conductor 82 and a pair of coil halves 84 and 86. A conductor 85 extends between the coil halves 84 and 86 to connect them electrically. As will be noted in FIG. 2, the coil halves 84 and 86 are parallel to each other, and their windings are in the same direction. The input conductor 82 extends to the coil half 84, while a return conductor 88 extends from the coil half 86.

Referring to FIG. 3, it will be seen that the input conductor 82 extends along the outer surface 18 of the inner cylinder 12, with the coil half 84 shown wound about splines 20 and 22. The conductor 85 extends from the coil half 84 to the coil half 86, which is substantially parallel to the coil half 84. The coil half 86 is wound about splines 26 and 28, which are respectively diametrically opposite the splines 20 and 22.

The coil 90 includes an input conductor 92 and a pair of coil halves 94 and 96 which are wound respectively about the splines 22, 24, and 28,30. The coil halves 94 and 96 are tied together by a conductor 95. The coil halves 94 and 96, while physically separated, are parallel to each other and their windings are in the same direction, thus providing an additive effect on each other, rather than a subtractive or cancelling effect. A return conductor 98 extends from the coil half 96 and is connected to the return conductor 88 of the coil 80, and also to a return conductor 108 for the coil 100.

The coil 100 is similar to the coils 80 and 90, and it includes an input conductor 102 and a pair of coil halves 104 and 106. A conductor 105 extends between the coil halves 104 and 106. The coil halves 104 and 106 are, like the coil halves of the coils 80 and 90, substantially parallel to each other and extending in the same direction. The return conductor 108 extends from the coil half 106 to the single return conductor 110 at the juncture of the return conductors 88 and 98 of the coils 80 and 90, respectively.

The coil half 104 is wound about the splines 24 and 26, and the coil half 106 is wound about the splines 20 and 30. The coil half 94 is wound about the splines 22 and 24, and the coil half 96 is wound about the coil halves 28 and 30. As indicated above, there is a limited amount of overlap of the coil halves since each spline is used for two coil halves of adjacent coils. The input conductor 102 extends to the coil half 104, and the return conductor 108 extends from the coil half 106 to tie in, or be electrically connected, to the return conductors 88 and 98.

Figure 5:
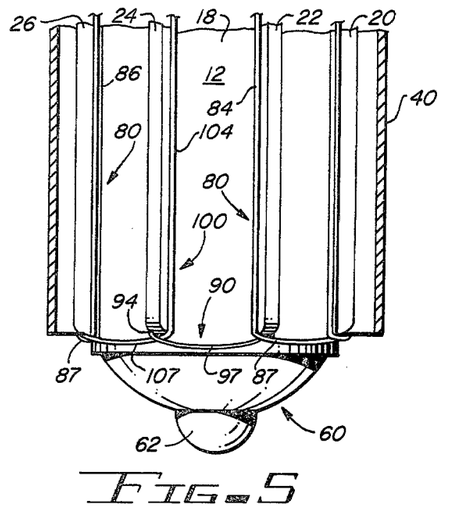
FIG. 5 comprises an enlarged side view of a portion of the pen included in the apparatus of the present invention.
Figure 6:
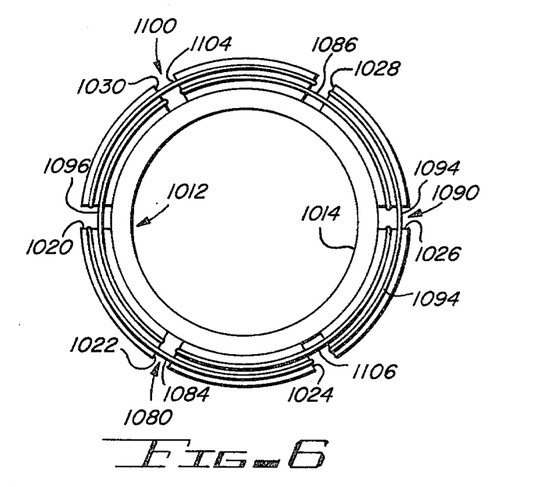
FIG. 6 is a schematic representation of an alternate winding embodiment of the pen apparatus of the present invention.
Figure 7:
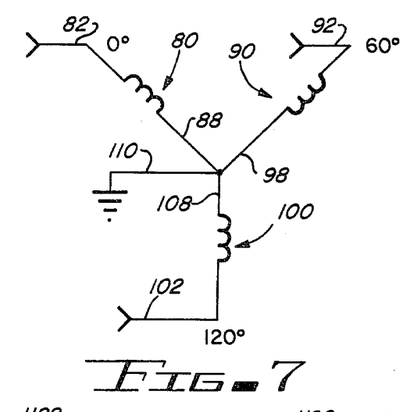
FIG. 7 is a schematic illustration of an input signal element for the pen apparatus of the present invention.

The principal portions of the coils 80, 90, and 100 that are concerned with the graphic writing or communication in the apparatus of the present invention is best illustrated in FIG. 2 as comprising the lower, horizontal end portions 83 and 87 of the coil halves 84 and 86, respectively. Thus, when the pen apparatus is assembled, as shown in FIG. 4, the lower, horizontal portions 83 and 87 of the coil halves 84 and 86, respectively, are disposed closest to a writing surface 122, as shown in FIGS. 5, 6, and 7, and are accordingly the primary portions of each coil with respect to the "writing" of information, graphically, onto a writing surface.

To maximize the efficiency of the lower ends 83 and 87 of each coil, half of all three coils 80, 90, and 100, and to minimize the electrical or magnetic effects of the other portions of the magnetic coils, a metal shield 40 is shown in FIGS. 1 and 4 as covering axially virtually the entire coil halves except for the lower ends thereof.

The metal shield 40 comprises a cylinder which is disposed within the outer cylinder or housing 50 and about the lower ends of the coils 80, 90, and 100. The metal shield 40 includes a lower end 42, best shown in FIG. 4, as extending substantially the entire cylindrical length, axially speaking, of the inner cylinder 12, and about the outer or exterior portion thereof, except for the lower ends of the three writing coils 80, 90, and 100.

Disposed about the inner cylinder 12 and the shield 40 is the outer cylinder or cylindrical housing 50. The outer cylinder or housing 50 comprises a housing for the pen apparatus 10, and the various elements are disposed in a central, longitudinally extending bore therein. At the lower part of the housing 50, as best shown in FIG. 4, are outer threads 52 which mate with a cap 70. The cap 70 includes internal threads 72. The threads 52 and 72 are shown in FIG. 4 engaging each other to secure the cap 70 to the outer cylinder or housing 50.

It will be noted from FIG. 4 that the metal shield cylinder 40 extends substantially throughout the length of the inner cylinder 12, which is also substantially the same as the length of the inner bore or interior of the housing 50. The outer cylinder or housing 50 is closed at its upper end by a circular or spherical end wall 56. The end wall 56 includes a coaxially extending aperture through which the appropriate input conductors 82, 92, 102 and return conductor 110 for the coils 80, 90, and 100 extend.

For writing purposes, the cartridge 60 includes a ball point 62 connected to an ink reservoir 66, substantially similar to ball point pens in current usage. The cartridge 60 is disposed within the bore 14 of the cylinder 12, and is slightly axially movable therein. The cartridge 60 is held within the bore 14 by the cap 70, as best shown in FIG. 4. A switch (not shown) is actuated by an axial movement of the cartridge when the pen is disposed in a writing, generally upright, position for connecting the input signals to the pen coils. The ball point 62 extends beyond the lower ends of the three signal generating or writing coils 80, 90, and 100 for writing.

The pen apparatus 10 is held together by the cap 70. The cap 70 includes an interior bore 74 which is dimensioned to receive the lower portion of the cartridge 60, while the interior threads 72 of the cap 70 threadedly engage the exterior or outer threads 52 of the outer cylinder or housing 50.

An input signal is put into the three coils of the pen apparatus 10, with a phase difference of sixty degrees between each input signal. As best shown in FIGS. 1 and 3, the input signals are connected to input conductors 82, 92, and 102, of the coils 80, 90, and 100, respectively.

Three coils are used to maximize the signal strength in the apparatus. With only one coil, the signal may go to zero in certain pen orientations relative to pick-up or sense coils in the writing surface. The use of three coils provides relatively strong signals in virtually all orientations of the pen.

The coils are wound axially as opposed to circumferentially to prevent equal and opposite coil currents which reduce the signal strength. Circumferentially wound coils are also more sensitive to parallax than axially wound coils.

Since a writing pen or stylus is usually not disposed perpendicular to the plane of the writing surface, the coils are separated into spaced apart halves and the input signals are spaced apart in phase. These features help to reduce parallax and to maximize signal strength.

The shielding of the coils is another way to help reduce parallax. However, the amount of the shielding may be controlled to allow signals from the tops of the coils to contribute to the signals from the bottoms of the coils, if desired. The tops of the coils are of a negative phase with respect to the bottoms of the coils, and can accordingly subtract from the main signals from the bottoms of the coils. This may be advantageous for certain applications, such as when a pen is bent over a writing surface, which maximizes the signal strength in the direction the pen is moving.

Additional details of the pen apparatus 10 are shown in FIG. 5. FIG. 5 comprises a view in partial section of a lower portion of the pen 50 of FIGS. 1-4, illustrating the central cylinder or inner cylinder 12 with its coils disposed about the splines, and showing the metal shield 40 disposed about the inner cylinder 12. The shield 40 comprises a metallic cylinder covering most of the coil windings, leaving only the lower, horizontal portions of each coil unshielded. Thus, the lower, unshielded portions of the coils are the effective portions with respect to generating the magnetic fields from the output signals of the pen apparatus.

Each of the coils includes a lower, horizontally extending portion, denoted in FIGS. 3 and 5 by reference numerals 87, 97, and 107, for the coils 80, 90, and 100, respectively. The metal cylinder 40 shields the vertical portions of the coils and the upper or top horizontally extending portions of the coils, as desired, leaving the lower or bottom horizontally extending portions 87, 97, and 107 of the coils to provide the primary magnetic fields for writing purposes.

The shield 40 controls the signal from the top or upper portion of the coil of the pen for providing desired positive effect and for preventing negative effects.

Excess signals from a pen may result in false signals as to the location of the pen. The illusory location or locations of the pen, caused by excess signals may be controlled by appropriately shielding the coils.

Four splines 20, 22, 24, and 26 are shown in FIG. 5, with portions of the coils 80, 90, and 100 wound about the splines. The coil half 84 of coil 80 is shown wound about the splines 20 and 22, with the coil half 86 of the coil 80 shown wound about the spline 26 and spline 30, as best shown in FIG. 3. Coil half 94 of coil 90 is shown wound about splines 22 and 24, and coil half 104 of coil 100 is shown wound about splines 24 and 26.

The coil halves overlap each other in order to help minimize the variation in signal strength or output as the pen is rotated in writing. The composite signal from the coils varies with the extent of the overlap. If there is too much overlap, an overly strong signal at the point of overlap may be produced, and if there is not enough overlap, there may be a substantial variation in the signal between coils. Accordingly, the amount of overlap is controlled to provide the most desirable composite signal as the pen is rotated.

FIG. 6 comprises a schematic illustration of an alternate embodiment of the pen inner cylinder 12 of FIGS. 1, 3-5, comprising a pen inner cylinder 1012. An alternate embodiment of winding a plurality of coils on the inner cylinder 1012 is shown. The primary differences between the inner cylinder 1012 of FIG. 6 and the inner cylinder 12 of FIGS. 1, 3, 4 and 5 are that the inner cylinder 1012 includes a plurality of longitudinally extending flutes or recesses rather than the plurality of splines 20 . . . 30, shown best in FIG. 3 for the inner cylinder 12, and a greater overlap of adjacent coils from the embodiment of FIGS. 1–5.

The inner cylinder 1012 of FIG. 6 includes six longitudinally extending flutes 1020, 1022, 1024, 1026, 1028, and 1030. The flutes 1020 . . . 1030 comprise longitudinally extending recesses. The recesses are of sufficient width to accommodate portions of coil windings within the recesses. Thus, rather than having the coils wound about the splines of the cylinder 12, the coils are wound or are contained within the recesses of the cylinder 1012.

In FIG. 6, each coil half is represented by only a single conductor, for clarity, extending between and around a pair of flutes or recesses. As discussed above, each of the three coils is comprised of a pair of coil halves separated from each other and wound in the same direction so that the net effect of both coil halves is additive rather than subtractive with respect to each other. The coil halves in the embodiment of FIG. 6 are overlapping to a much greater extent than with respect to the coils and coil halves of FIGS. 1, 3, 4, and 5. The coil halves in the embodiment of FIG. 6 are not wound about or through adjacent flutes, but rather are wound about or through every other flute, which means that each coil half overlaps each other coil half to a substantial extent.

Three coils 1080, 1090, and 1100 are shown in FIG. 6. The coil 1080 includes a coil half 1084 and a coil half 1086. The coil half 1084 is wound between the flutes 1020 and 1024, while the coil half 1086 is wound between the flutes 1026 and 1030.

The coil 1090 includes a coil half 1094 and a coil half 1106. The coil half 1104 is wound between the flutes 1028 and 1020, and the coil half 1106 is wound between the flutes 1022 and 1026.

The coil half 1084 overlaps a portion of the coil halves 1096 and 1106 of the coils 1090 and 1100, respectively. The coil half 1094 overlaps a portion of the coil half 1086 and the coil half 1106 of the coils 1080 and 1100, respectively. The coil half 1086 in turn overlaps a portion of the coil half 1094 and the coil half 1104 of the coils 1090 and 1100, respectively. The coil half 1104 of the coil 1100 overlaps a portion of the coil half 1086 and a portion of the coil half 1096 of the coils 1080 and 1090, respectively. The coil half 1096 overlaps a portion of the coil half 1104 of the coil 1100 and a portion of the coil half 1084 of coil 1080. It will thus be seen that each of the coil halves overlaps a portion of the two adjacent coil halves for a greater overlapping of the signals provided by the coils. As indicated previously, the coil halves of each coil are wound in the same direction for an additive effect of the coil halves of each coil. The overlap or wrap angle of each coil half also helps to control the parallax effect of the coils. Thus, in addition to the shielding of the coils, as discussed above, and as illustrated perhaps best in conjunction with FIG. 5, the overlapping or wrap angles of the coil halves is used to decrease the parallax effect of the vertical length of the coils to reduce spurious images of the pen location.

FIG. 7 comprises a schematic representation of the input signals to the pen coils 80, 90, and 100 of FIGS. 1–5. The phase differential between the input signals, as illustrated in FIG. 7, is sixty degrees. The input signal on conductor 82 to the coil 80 is thus considered to be at zero degrees, while the input signal on conductor 92 to the coil 90 follows the input signal to the coil 80 by sixty degrees. The input signal on conductor 102 for the coil 100 follows sixty degrees behind the input signal for coil 90. The return conductors 88, 98, and 108 for the three coils are connected together to a common conductor 110.

The schematic representation of FIG. 7 may be used with the apparatus of FIGS. 1–5 and also the apparatus of FIG. 6. The particular type of coil winding arrangement used by the pen, as discussed above, is immaterial with respect to the input signal arrangement as shown in FIG. 7.

Figure 8:
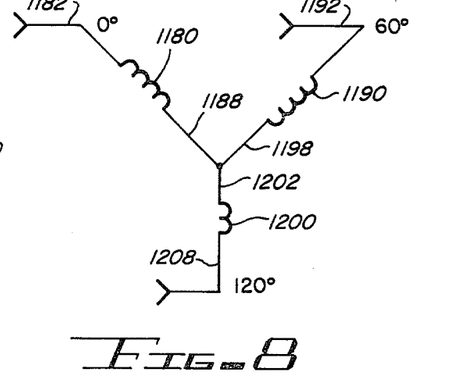
FIG. 8 is a schematic illustration of an alternate embodiment of the input signal elements of FIG. 7.

FIG. 8 comprises an alternate embodiment of the pen coil apparatus discussed above in conjunction with FIGS. 1–7. Three coils 1180, 1190, and 1200 are shown connected together, but only two input amplifiers are required in conjunction with the embodiment of FIG. 12. The phase difference between the coils is sixty degrees, as with the coils discussed above. An amplifier (not shown) provides an input signal into an input conductor 1182 for the coil 1180, and a second amplifier (not shown) provides an input signal into a conductor 1192 for the coil 1190. The input signal to the coil 1190 is sixty degrees out of phase with, or after, the input signal for the coil 1180. A conductor 1188 is connected to the coil 1180 and comprises the return conductor for the coil 1180, and a conductor 1198 is connected to the coil 1190 and comprises the return conductor for the coil 1190. The return conductors 1188 and 1198 are connected together to an input conductor 1202 for the coil 1200. The coil 1200 includes a return conductor 1208. The coil phasing of the output from the coils 1180 and 1190 provides the third phase, or 120 degrees, for the input to the coil 1200.

It will be noted that the schematic illustration of the coils 1180 and 1190 have the same number of turns, while the number of turns schematically illustrated for the coil 1200 includes half the turns included for each of the coils 1180 and 1190. The reason for this is that the current through the coils 1180 and 1190 is added in the coil 1200, and thus only about half the number of turns is required in the coil 1200 to provide the same signal strength as each of the coils 1180 and 1190 provides.

It will be noted that the embodiment of FIG. 8 eliminates one amplifier or driver, reduces the number of turns in a coil, and eliminates a fourth wire, a common return conductor, since the coil 1200 has approximately half the number of turns as in the coils 1180 and 1190 and its input comprises the output from coils 1280 and 1290. FIG. 8 thus has certain advantages over the embodiment of FIG. 7.

Figures 9, 10, 11, 12:
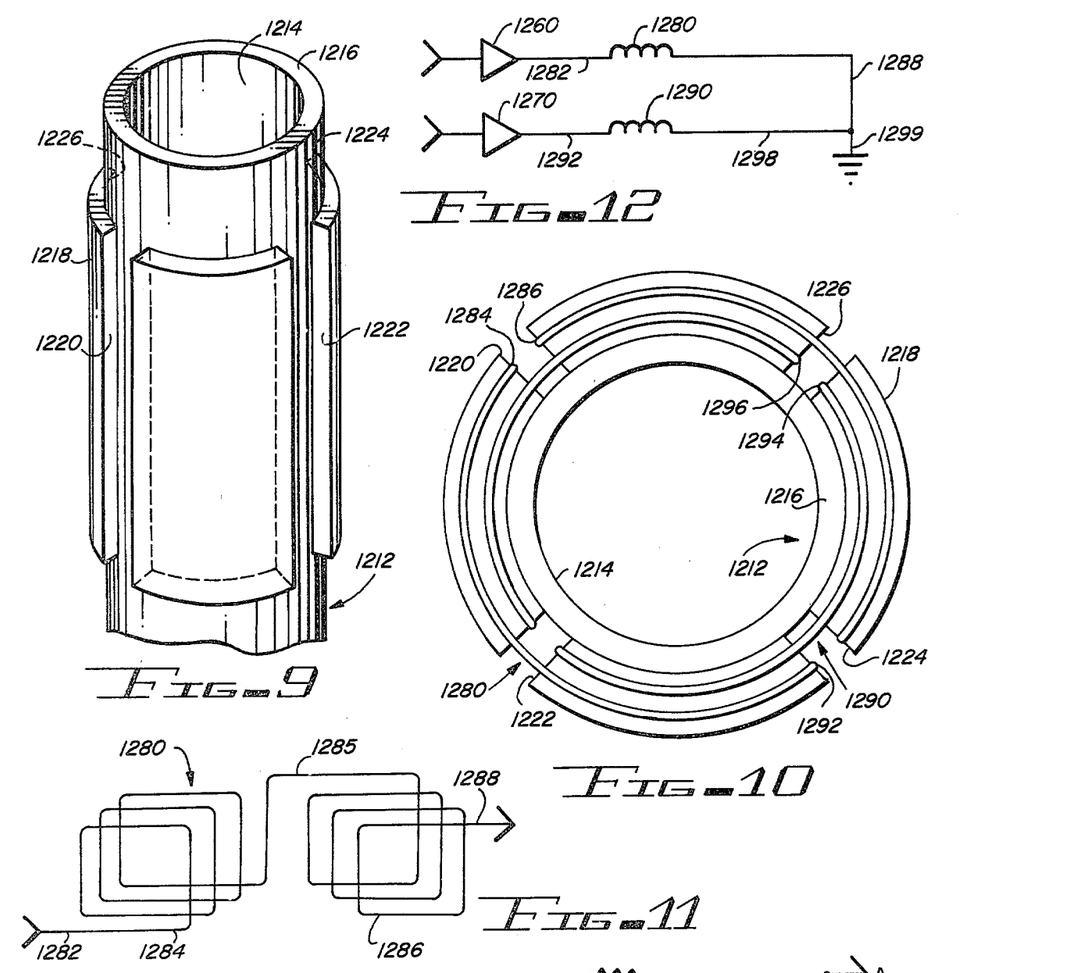
FIG. 9 is a perspective view of an alternate pen structure usable with the apparatus of the present invention.
FIG. 10 is an enlarged end view of the apparatus of FIG. 9 schematically illustrating input coils secured thereto.
FIG. 11 is a schematic illustration of an input coil of FIG. 10.
FIG. 12 is a schematic representation of input signal apparatus for the pen apparatus of FIGS. 9, 10, and 11.

FIGS. 9 and 10 disclose an alternate embodiment of a writing pen using only two coils, each of which comprises two half coils or coil halves, rather than the three coils discussed above in conjunction with FIGS. 1–8. FIG. 9 comprises a perspective view of the lower portion of an inner cylinder 1212, without coils shown thereon. FIG. 10 comprises a top view of the cylinder 1212, schematically illustrating two coils 1280 and 1290 disposed on the cylinder.

The cylinder 1212 includes an interior bore 1214 which receives a ball point pen cartridge, such as the cartridge 60 shown best in FIGS. 1 and 4. The cartridge 60 is movable in the bore 1214, and a switch is connected to the cartridge, all as discussed above. A face 1216 comprises the lower termination of the cylinder 1212. The face 1216 extends between the bore 1214 and the outer periphery of the cylinder 1212.

Spaced slightly above the lower face 1216 of the cylinder 1212 is an enlarged cylindrical portion 1218. The cylinderical portion 1218 includes four flutes 1220, 1222, 1224, and 1226, all of which extend axially the length of the cylinder 1218. The depth of the flutes 1220 . . . 1226 is substantially the radial width of the cylindrical portion 1218, from the outer periphery of the cylinder 1212 to the outer periphery of the cylinder 1218. Thus, the flutes 1220 . . . 1226 comprise axially extending slots which receive the coil windings of the two coils 1280 and 1290. The coils 1280 and 1290 include two coil halves each, including a coil half 1284 and a coil half 1286 for the coil 1280, and a coil half 1294 and a coil half 1296 for the coil 1290.

In FIG. 10, the coil half 1284 is shown extending in one direction between the flute 1220 and the flute 1224, while the coil half 1286 extends in the opposite direction around the cylinder 1212, also between the flutes 1220 and 1224. The coil 1290 is divided into two portions, with the coil half 1294 extending in one direction around the cylinder 1212 between the flutes 1222 and 1226, and the coil half 1296 extending in the opposite direction around the cylinder 1212 between the same two flutes 1222 and 1226. It will be noted, as discussed above, in conjunction with the other pen coils, that the coil halves for the coils are wound in the same direction and are connected by an appropriate conductor, to provide an additive effect of the field generated by the coils. With only two coils, the overlap of the coils is greater than that illustrated above for three coils.

The cylinder 1218, with its flutes or axially extending slots, comprises a coil form for the two coils. The coils wound about the coil form, as best shown in FIG. 10, are schematically illustrated as including only a single turn, for purposes of clarity, such as discussed above in conjunction with FIG. 6. Obviously, the coils comprise a plurality of turns, as schematically illustrated in FIG. 11, which comprises a schematic illustration of the coil 1280, with its two coil halves 1284 and 1286 shown "unfolded", so to speak, from the orientation shown in FIG. 10.

The coil 1280 includes an input conductor 1282 which extends to the coil half 1284. The coil half 1284 comprises a plurality of turns, all wound in the same direction, and connected to the coil half 1286 by conductor 1285. The coil half 1286 also comprises a plurality of turns, the same number of turns as the coil 1284, and wound in the same direction as the coil half 1284. The coil half 1286 terminates in a conductor 1288 which comprises the return conductor for the coil 1280. The coil 1290 is substantially identical to the coil 1280.

FIG. 12 comprises a schematic representation of the input signals for the coils 1280 and 1290 illustrated in FIGS. 9, 10, and 11. Two drivers 1260 and 1270 are shown in FIG. 12 as connected to the coils 1280 and 1290, respectively. The output of the driver 1260 is connected to the writing coil 1280 by the conductor 1282, while the driver 1270 is connected to the writing coil 1290 by an input conductor 1292. The return conductor 1288 from the coil 1280 is connected to a return conductor 1298 from the coil 1290, and both return conductors are connected to a common return conductor 1299. The input signal to the coils 1280 and 1290 are phase shifted ninety degrees. An alternative to the phase shifting of the input signals is to switch a single input signal from one input coil to the other. The two pen coils are thus no "on" at the same time. This will be discussed below.

Figure 13:
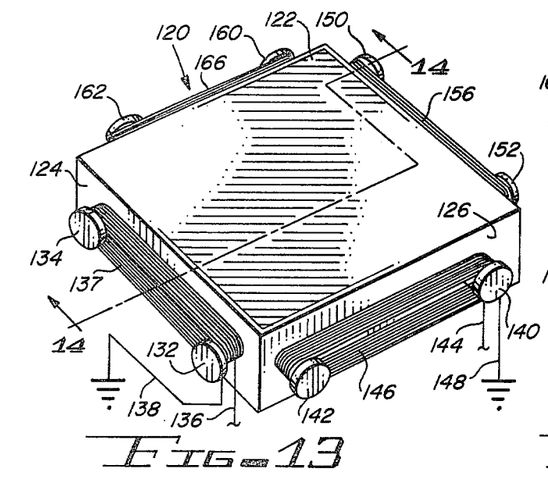
FIG. 13 is a perspective view illustrating a writing surface of the present invention.
Figure 14:
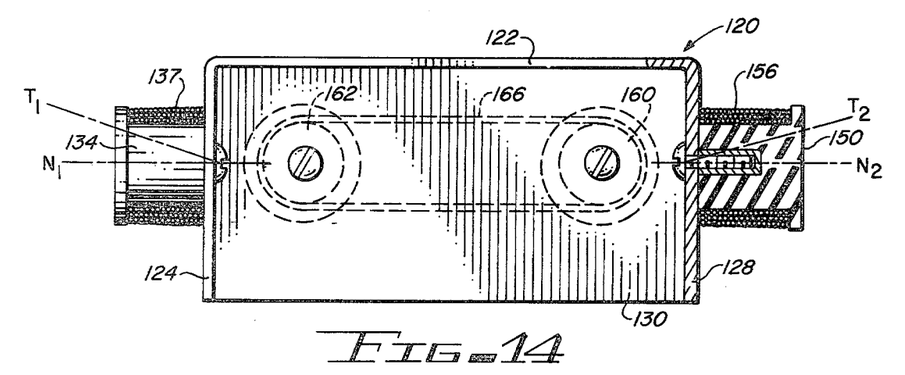
FIG. 14 is a view in partial section of the apparatus of FIG. 13 taken generally along line 14—14 of FIG. 13.
Figure 15:
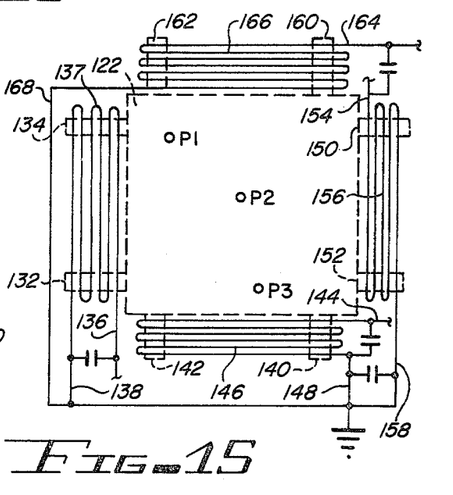
FIG. 15 is a schematic illustration of the coil arrangement of the apparatus of FIGS. 13 and 14.

FIG. 13 comprises a perspective view of a writing surface 120. FIG. 14 is a view in partial section of the writing surface 120 of FIG. 13, taken generally along line 14—14 of FIG. 13. FIG. 15 comprises a schematic diagram of the writing surface 120. Reference will be made primarily to FIGS. 13, 14, and 15, in the following discussion concerning the writing surface 120.

The writing surface 120 includes a top 122 with four depending sides 124, 126, 128, and 130 extending downwardly substantially perpendicular to the top 122. The top 122 is a planar surface, and it may be rectangular or square, as desired. Preferably, the writing surface is of sufficient size to allow the user to write a message on paper, or the like, disposed on the top 122. The signals induced in the coils of the writing surface are in turn transmitted to the apparatus schematically illustrated in FIG. 16, and discussed below.

A pair of coil forms is secured to each of the downwardly depending sides of the writing surface 120. The coil forms or posts provide support for the coils which comprise an appropriate number of turns of an electrical conductor. A pair of coil forms or posts 132 and 134 extend outwardly from the sides 124 substantially perpendicular thereto. The posts or coil forms 132 and 134 are appropriately secured to the side 124. As best shown in FIG. 6, the posts or coil forms are made of nonconductive material secured to the sides by an appropriate bolt or screw.

A plurality of wires, comprising a coil 137, are wound about the posts 132 and 134. A conductor 136 extends from the coil 137 to an amplifier, and the opposite end of the coil 132 from the conductor 136 comprises a common return or ground conductor 138. The construction of each of the coils is substantially the same as the coil 137. The depending side 126 includes a pair of coil forms or posts 140 and 142, and a coil 146 is wound thereabout, with a conductor 144 extending from the coil 146 to an amplifier and a common return conductor 128 is also connected to the coil 146.

A pair of coil forms or posts 150 and 152 are secured to the side 128, and the posts support a coil 156. The coil 156 is connected to an amplifier by a conductor 154, and the coil is terminated by a return or common conductor 158.

Finally, the depending side or wall 130 includes a pair of coil forms or posts 160 and 162 secured thereto. A coil 166, with an input conductor 164 and a return or common conductor 168, is wound about the posts 160 and 162. As best shown in FIG. 15, the return or common conductors 138, 148, 158, and 168 are connected together, while the input conductors are separately connected to an amplifier, as discussed below. It will also be noted that the input and output conductors of the coils may be capacitively connected, as shown in FIG. 15. The capacitors provide tuned circuits for the writing surface.

In FIG. 14, a line N1–N2 is shown extending through the coil forms or posts 134 and 150. The line N1–N2 is substantially parallel to the top 122 and accordingly is substantially perpendicular to the sides 124 and 128. If the coil forms secured to the sides 124 and 128 are substantially perpendicular to the sides, then a plane passed through the center of the coil forms or posts would pass through the line N1–N2. The coils 137 and 156, wound about the respective coil forms accordingly would be substantially parallel to the top 122 and perpendicular to the respective sides.

However, if the coil forms are disposed at an angle other than a right angle with respect to their respective sides, but parallel to each other in pairs on each side, then the angle of the coils is varied with respect to the sides and with respect to the top 122. This is shown in FIG. 14 by the lines T1 and T2. For example, if the coil form 134 is disposed along line T1 instead of N1, then the coil wound about the coil or post 134, and its parallel post or form 132, would not be in the same angular relationship to the surface 122 as presently illustrated in FIGS. 13 and 14. Similarly, if the coil form or post 150 and its companion or paired post 152 (see FIG. 13) is secured to the side or wall 128 with its axis along the line T2, then the coil 56 will be disposed on an angular orientation with respect to 122 different from that illustrated in FIGS. 13 and 14. The variation of the angle of the coils connected to the writing surface 120 may be varied to control the linearity of the detected signals transmitted to the amplifiers from the coils. The detected signals result, of course, from the magnetic fields induced by the signals in the coils of the writing pen or stylus 10, as discussed above.

Figure 16:
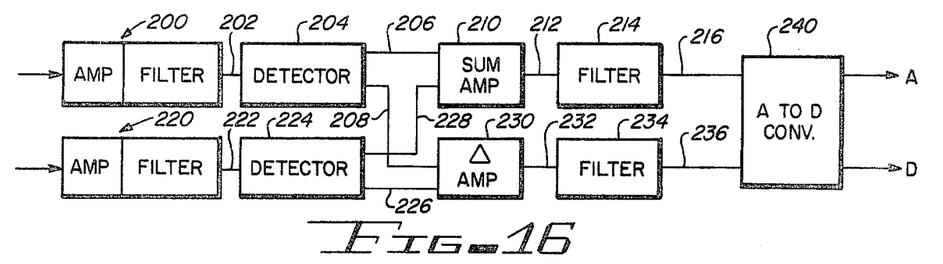
FIG. 16 is a schematic diagram of the signal detector in the apparatus of the present invention.

For detecting the location of the pen or stylus with respect to the surface 122, the coils 137, 146, 156, and 166 are connected to sum and difference or delta circuitry, which is illustrated in FIG. 16. For illustrative purposes herein, the coils 137 and 156 may be considered as a pair and considered as Y coils. The X and Y coils accordingly provide X and Y coordinates for locating the position of the writing pen on the top 122 of the writing surface 120.

The coils of the pen or stylus 10 produce a magnetic field which is detected by the coils of the writing surface 120. The closer the pen apparatus 10 is to a particular sense or sensing coil, the greater the output of that coil resulting from the pen.

There is also a frequency relationship which should be mentioned. The higher the frequency of the output signal of the pen, the greater will be the output from the writing surface 120, generally speaking, since the output generated by the pen in the sense coils of the writing surface 120 is a function of the magnetic flux cutting across the coil windings. The greater the frequency of the output signal, the faster the rise and fall times of the flux field with respect to the sense coils. With the output frequency of the pen coils the same, the frequency relationship is the same for all sense coils, and their output is, for practical purposes, a function of the distance between the pen and the sense coils, which is a location relationship. With respect to the specifics of the present apparatus, therefore, the greater the proximity of the pen writing coils to a particular sense coil on the writing surface, the greater will be the output from that particular sense coil. Conversely, the greater the distance the pen writing coils are from a particular coil of the writing surface 120, the weaker the output signal generated in the sensing coil and accordingly transmitted to the differential signal apparatus, shown schematically in FIG. 16. This may be contrasted with a circumferentially wound pen coil in which the signal is minimized the closer the pen gets to the sense coil, falling to zero when the pen coil is on top of a sense or pickup coil or wire.

Three pen locations are shown in FIG. 15, and denoted respectively by P1, P2, and P3. If the pen apparatus 10 is located at the position of P1 on the top surface 122 of the writing surface 120, the output coils of the pen will be located closer to coil 137 than to its parallel coil 156, and closer to coil 166 than to its parallel coil 146. Moreover, the pen is closer to coil 137 than to coil 166 and, about equal distance from the coils 146 and 156. The output from the respective sensing coils, or the input to the amplifiers from the coils, will result in output from coil 137 which is substantially greater than the output from coil 156, and an output from coil 166 substantially greater than that of coil 146. The output from coils 146 and 156 will be about the same. Through appropriate circuitry, in evaluating the coil outputs, it can be determined that the location of the pen is at P1, since P1 is the only location on the top writing surface 122 which will provide output voltages of the specific ratios, or sums and differences, as described in very broad terms, above. The location may be noted in terms of X and Y coordinates, which comprise ratios of output signal strength from the two X and the two Y coils.

With respect to pen location P2, the pen is substantially centrally located with respect to all four coils. With this equidistant relationship, the output from the sense coils, all four of them, will be substantially the same. Again, taking the sum and difference of the respective parallel coils, the specific location of the pen may be determined in accordance with predetermined signal strength or ratio parameters with respect to the output voltages from the four sense coils.

At pen location P3, the pen is closer to coil 156 than to its parallel coil 166, and the output of the coil 146 is accordingly substantially greater than that of coil 166. However, the pen at location P3 appears to be about equally spaced between the coils 137 and 156, and the outputs of the two coils would accordingly be about the same. Again, by taking the difference and by adding the sum of the outputs of the coils, the specific location of the pen at P3 may be determined.

While only three illustrations of the location of the pen with respect to the writing surface 122 have been discussed above, it is obvious that the location of the pen at any spot or location on the top 122 of the writing surface 120 will provide a particular output from each of the four sensing coils 137 . . . 166. The output from the four coils may in turn be translated to a specific location on the surface. The tuning of the coils enhances the ability of the writing surface 120 to accurately locate the pen with respect to the top 122 by rejecting spurious signals and by increasing the signal to noise ratio to provide a strong signal.

FIG. 16 comprises a block diagram of the sensing apparatus connected with the writing surface 120 of the present invention. Input signals from the parallel paired sensing coils of the writing surface 120 are transmitted to the apparatus shown in block form in FIG. 16. For example, an input from one of the sense coils is transmitted to amplifier/filter 200, while the output from the second coil of the pair of parallel coils is transmitted to an amplifier/filter 220. The output from the coils accordingly defines the input signals to the amplifiers 200 and 220.

After amplification and filtering to remove spurious signals, noise, and the like, the signals are transmitted by a pair of conductors 202 and 222, respectively, to a pair of detectors 204 and 224. The detected input signals from the coils are then transmitted to a sum amplifier 210 and to a difference or differential amplifier 230. From the detector 204, a conductor 206 extends to the sum amplifier 210, and a conductor 208 extends to the differential amplifier 230. From the detector 224, a conductor 226 extends to the sum amplifier 210. The signals from both detectors 204 and 224 are accordingly provided to both the sum amplifier 210 and the differential amplifier 230.

The detectors 204 and 224 are preferably operational amplifier diode detectors, which are not phase sensitive. As the pen apparatus 10 is rotated on the writing surface, the phase of the output signal of the pen changes, and correspondingly the phase of the input signal to the detectors also changes. Such change has no effect on the detectors 204 and 224. Other types of detectors, such as a peak detector, may also be employed.

Within the sum amplifier 210, the signal from both coils of the pair of parallel coils is added and is then transmitted by a conductor 212 to a filter 214. From the filter 214, the sum output is transmitted on a conductor 216. At the same time, the differential output from the two parallel coils is transmitted from differential amplifier 230 by a conductor 232 to a filter 234. The differential output, or the difference between the amplitude of the output voltage of the parallel coils, is filtered by the filter 234 and is transmitted on the conductor 236.

The sum and delta (difference) signals on conductors 216 and 236 are transmitted to a multiplying analog to digital converter 240, where the two signals are multiplied together to provide a ratio of the sum and delta signals. The final ratio output signal may either be in analog form (A) or in digital form (D), or both, depending on how the signal is to be used. For example, for computer use, digital information is preferable, but for direct communication, analog information is preferable. The output from the converter 240 is the ratio of the two signals, the sum and the delta signals, corrected for variations in pen movement, such as picking the pen up from the writing surface, rotating the pen, and many other variations. While the absolute values of the sum and delta signals may vary, the ratio of the two will remain the same, thus eliminating pure amplitude signals by providing a ratiometric output which is based on amplitude. For each sum and difference, or ratio thereof, the pen may be located at only a single line or distance between the two X or Y parallel coils, and the single line is parallel to and disposed between the particular pair of detector or sense coils that is being considered.

A pair of amplifier-detector-filter-multiplier circuit elements is required for each parallel set or pair of sense coils. There accordingly will be a pair of X and a pair of Y circuit elements. When both pairs, the X pair and the Y pair, of sense coils, is appropriately considered by the circuit elements, the ratiometric outputs define a specific location between each pair of parallel coils. The two lines from the two pairs of coils intersect at the location corresponding to the location of the pen at the time that the particular output is generated. Such a location may be given an X and a Y coordinate identity, and a plurality of such X and Y coordinates may be then graphically portrayed by a printer or place in a computer memory at substantially the same time as a writer is writing with a pen on a writing surface.

The ratiometric output signal provides a more accurate basis for locating the pen with respect to the top 122 than using only a sum or a differential output. The algebraic difference between the outputs (amplitudes) of a pair of parallel coils is used to determine the specific location of the pen with respect to the writing surface 122, while the algebraic sum, or the total amplitude, is used to tell how far the pen is from the writing surface, such as the top 122. it is accordingly necessary to use both the sum signal and the differential signal in determining the location, because it will be understood that if the pen is disposed above the writing surface top 122, the resulting output in all of the coils will be different from the output signal from the coils if the writing pen is disposed on the surface of the top 122. Thus, by monitoring both the sum and difference in the signal levels, a variation in the height of the pen from location to location may be taken into consideration and cancelled so that a false location signal is not transmitted.

The apparatus of the present invention provides high signal to noise ratio, as compared with the prior art. Moreover, there is no smapling or phase shifting with the apparatus of the present invention that introduces errors into the writing.

Another advantage of the apparatus of the present invention, as discussed above, is that there is a continuous output of data, which is advantageous to, for example, CRT displays. The high signal to noise ratio provides a much greater signal level output and accordingly reduces the amplifying, filtering, etc. that is required in processing the location information.

By then pen coil arrangement as discussed above, the parallax error due to the angle of the pen over the surface 122 is reduced substantially. As previously indicated, each of the input coils are divided into two parts or portions, but the magnetic field is in the same direction in both portions of the coil since the windings are in the same direction. The coil halves are accordingly additive to each other.

Figure 17:
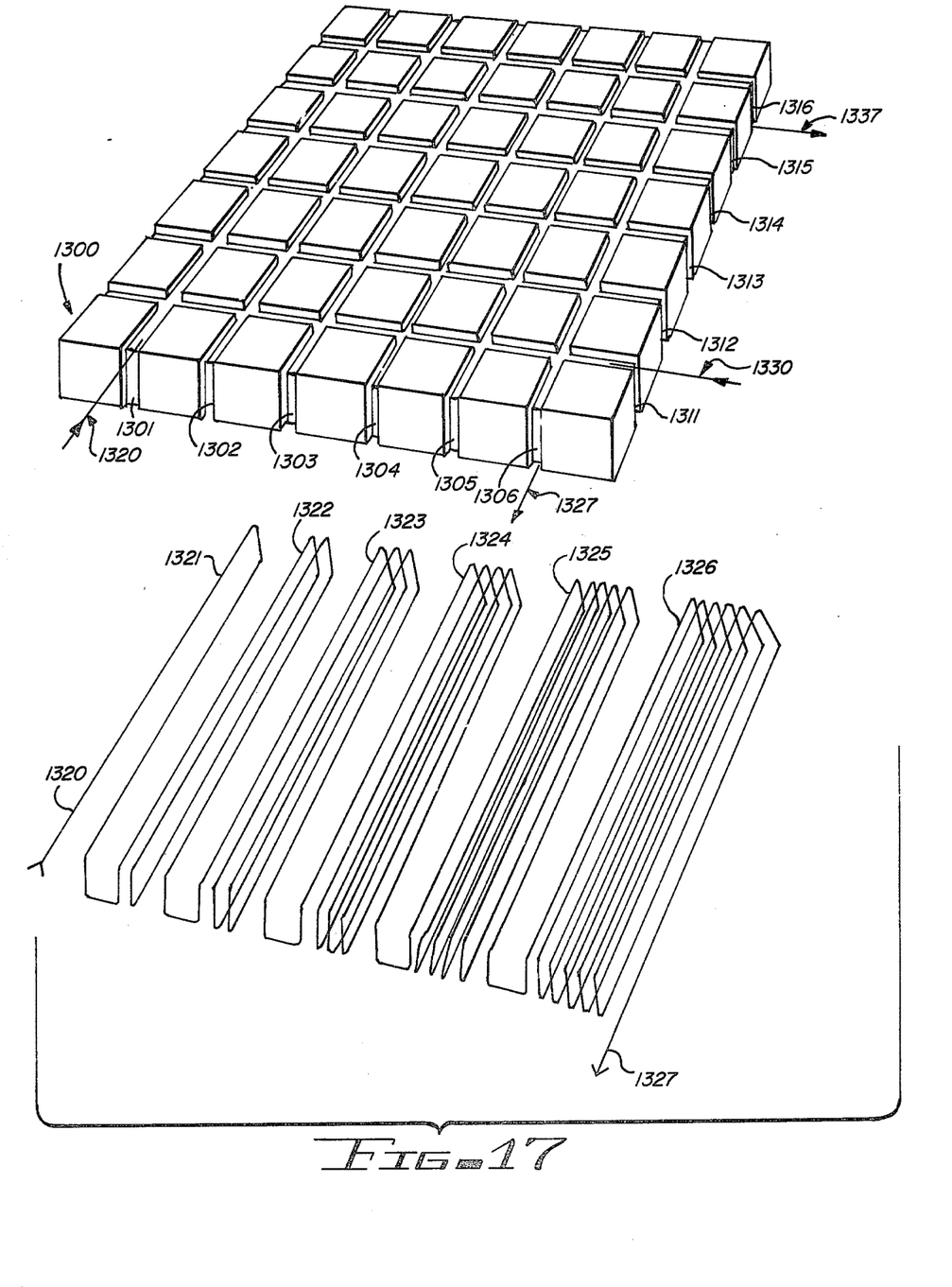
FIG. 17 is a perspective schematic representation of an alternate embodiment of a writing surface.

FIG. 17 comprises a schematic representation of an alternate embodiment of the writing surface 120 discussed above in conjunction with FIGS. 5, 6, and 7. The coil arrangement of FIG. 13 comprises a pair of conductors 1320 and 1330 wound perpendicularly to each other in an increasing number of turns as the conductors extend across a writing surface 1300. In the writing surface 120, four coils are shown disposed parallel to the outer edges of the writing surface, with the four coils comprising two pair of coils. One pair of coils is parallel to each other and disposed along two opposite sides of the writing surface, and the other pair is also parallel to each other, and disposed at the other two opposite edges of the writing surfaces, and perpendicular to the first pair of coils and edges. In the embodiment of FIG. 17, two conductors 1320 and 1330 are wound about the writing surface 1300, with each conductor including a varying number of turns which increases from one side of the writing surface to the other, and with the coils of the conductors perpendicular to each other. The conductor 1320, with its windings, comprises an X direction sense coil, and the conductor 1330, with its windings comprises a Y direction sense coil.

The writing surface 1300 is shown in perspective, with a plurality of slots extending across the writing surface from one edge of the surface to another. For illustrative purposes, six slots 1301, 1302, 1303, 1304, 1305 and 1306 are shown extending in one direction across the writing surface. The slots 1301 . . . 1306 receive windings or coils of the conductor 1320, which is schematically shown spaced apart from the writing surface 1300. The writing surface 1300 with its slots comprises a coil form about which the coil windings are wound.

The conductor 1320 includes a one turn winding or coil 1321 disposed in slot 1301, a two turn winding or coil 1322 disposed in slot 1302, a three turn coil disposed in slot 1303, and so on, until the slot 1306 receives a six turn coil 1326. A return conductor 1327 extends from the coil 1326. It will be noted that the coils 1321 . . . 1326 are connected together and are wound in the same direction.

The writing surface 1300 also includes a plurality of slots 1311 . . . 1316 extending substantially perpendicularly to the slots 1301 . . . 1306. The slots 1311 . . . 1316 receive the turns of the conductor 1330. The turns of the conductor 1330 are substantially the same as the turns of the conductor 1320, with the slot 1311 receiving a single turn coil, the slot 1312 receiving a two turn coil, and so forth, with a return conductor 1327 extending from a six turn coil in the slot 1316.

The number of slots in the writing surface, and the number of turns of coil in each slot, of course may vary with the size of the writing surface, etc. FIG. 17 comprises only a schematic representation.

It will be understood that as a writing pen moves from left to right, the signal induced in the conductor 1320 will increase as the magnetic flux from the pen apparatus cuts across an increasing number of turns of the conductor. At the same time, the signal induced in conductor 1320 will decrease as the pen moves from right to left because the magnetic flux will be cutting through a decreasing number of turns of the conductor.

Similarly, with conductor 1330 extending in the Y direction, or substantially perpendicular to the conductor 1320, the output from the conductor will increase as the pen moves from bottom to top, and will decrease as the pen moves from top to bottom. Since the pen location is a function of the output of the conductors 1320 and 1330, the overall effect of locating a writing pen or stylus is substantially the same as discussed above.

With respect to the embodiment of FIG. 17, it may be understood that the Figure schematically represents a simplified illustration of winding a square or rectangular writing surface, with the coils disposed in grooves or slots on the writing surface, in parallel fashion, as opposed to being disposed at the ends of the writing surface, as with the embodiment of FIGS. 13–15. The apparatus of FIG. 17 is advantageous in that a larger writing surface may be used, as compared to the apparatus of FIGS. 13–15, due to the different sense coil arrangement.

Figure 18:
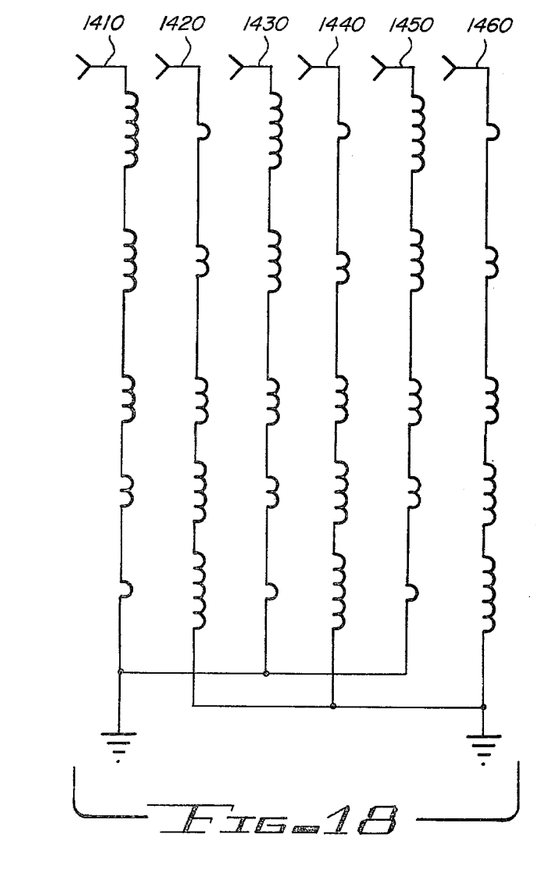
FIG. 18 is a schematic representation of another alternate embodiment of a coil arrangement for a writing surface.

FIG. 18 comprises a schematic representation of another embodiment of sense coil wiring for a writing surface (not shown). The Figure discloses six X direction sense coil conductors 1410, 1420, 1430, 1440, 1450, and 1460, which comprise the X direction sense coil grid. The six sense coil conductors are aligned generally parallel to each other. Each sense coil conductor includes a plurality of individual or discrete coils. The individual or discrete coils in each sense coil conductor are connected in series with each other, with a plurality of such serially connected discrete coils comprising a single sense coil conductor.

Each discrete sense coil contains a different number of turns or windings from its serially adjacent coils, with the number of turns or windings increasing (or decreasing, depending on which way one is considering a sense coil conductor, whether one is counting "up" or "down",) in the serially adjacent coils in a predetermined numerical relationship or order. Furthermore, the parallel adjacent discrete coils, that is, the discrete coils in the adjacent sense coil conductors, also have different numbers of turns or windings, with the number of turns or windings also increasing (or decreasing) in a predetermined numerical relationship or order.

The conductors 1410, 1430, and 1450 are connected in parallel and comprise one channel, and the conductors 1420, 1440, and 1460 are connected in parallel and comprise a second channel. The conductors 1410, 1430, and 1450 are substantially alike with respect to their coils, and the conductors 1420, 1440, and 1460 are substantially alike with respect to their coils.

The sensing of a specific location of a pen is accomplished in substantially the same manner as discussed above, with the conductors 1410 . . . 1460 being duplicated substantially perpendicular to the show conductors for sensing in the Y direction, as opposed to the X direction, as shown. The pen at any location will cause output signals of varying strengths in the sense coil conductors of the coil grid, and such varying strengths define a specific location when both X and Y conductors or coil grids are taken into consideration.

It will be noted that the embodiment of FIGS. 13–15 may be quite satisfactory for a relatively small writing surface. However, the coil arrangement of the embodiment of FIGS. 13–15 does not lend itself to a relatively large writing surface. However, the coil arrangements of FIGS. 17 and 18 lend themselves to relatively large writing surfaces and accordingly may be so employed.

Figure 19:
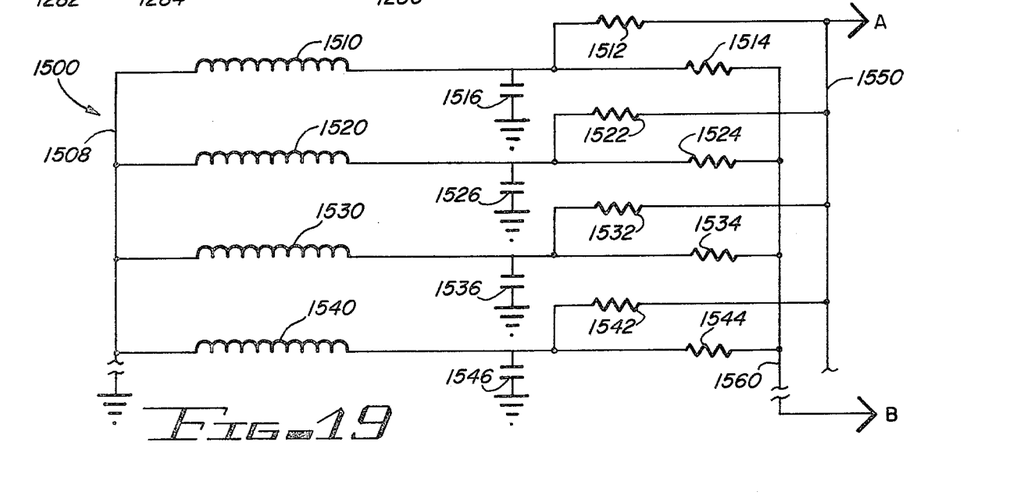
FIG. 19 is a schematic diagram of another alternate embodiment of a coil arrangement for a writing surface.

FIG. 19 comprises a schematic representation of an alternate embodiment of a sensing coil array structure or structure 1500 for a writing surface. A writing surface (not shown) may include a plurality of coils 1510, 1520, 1530, and 1540 connected together in a generally parallel relationship. Each of the coils 1510 . . . 1540 is connected together to a circuit common conductor 1508. Each of the coils 1510 . . . 1540 includes the same number of turns. The coils are spaced apart from each other in a general parallel alignment, as shown. It will be noted that two sets of coils are required, with one set of coils for sensing in the X direction, and another set of coils for sensing in the Y direction. As illustrated in FIG. 19, the coils 1510 . . . 1540 of the coil array 1500 comprise coils for sensing in the Y direction.

The coil array 1500 as shown in FIG. 19 includes a plurality of coils 1510 . . . 1540, and it will be understood that the four coils shown comprise only a portion of the Y directional coils of the coil array 1500. One end of each of the coils is connected to the common conductor 1508, as discussed above, and the opposite ends of the coils, remote from the conductor 1508, are connected to a pair of resistors. Intermediate the coils and their pair of resistors is a capacitor for tuning the coils.

Coil 1510 is connected to a pair of resistors 1512 and 1514. The resistor 1512 is in turn connected to an output conductor 1550, while the resistor 1514 is connected to an output conductor 1560. The output conductors 1550 and 1560 may be referred to as channels A and B, respectively, as will be discussed in detail below.

A tuning capacitor 1516 is connected between the coils 1510 and the pair of resistors 1512 and 1514.

The coil 1520 extends between the conductor 1508 and a pair of resistors 1522 and 1524. Intermediate the coil 1520 and the juncture of the resistors 1522 and 1524 is a tuning capacitor 1526. The resistor 1522 is connected to the channel A output conductor 1550, and the resistor 1524 is connected to the channel B output conductor 1560.

The coil 1530 extends between the conductor 1508 and a pair of resistors 1532 and 1534, which are also connected respectively to the output conductors 1550 and 1560. A tuning capacitor 1536 is connected between the coil 1530 and the juncture of the resistors 1532 and 1534.

Finally, the coil 1540 extends between the conductor 1508 and a pair of resistors 1542 and 1544. The resistors 1542 and 1544 are in turn connected to the output conductors 1550 and 1560, respectively. A tuning capacitor 1546 is connected between the coil 1540 and the resistors 1542 and 1544.

If desired, the tuning capacitors may be omitted, but for the convenience of providing tuned circuits, the capacitors are illustrated in FIG. 19.

A coil array, such as the coil array 1500, which is a Y direction array, will be disposed substantially perpendicular to the array 1500 for sensing movement of a pen in the X direction. The showing of a second array has been omitted from FIG. 19, as it was for FIG. 18.

The resistors 1512, 1522, 1532, and 1542, are appropriately sized to provide an increasing output from the channel A conductor 1550 as a writing pen is moved vertically, or in the Y direction, from the area of the coil 1540 to the area of the coil 1510. Similarly, the resistors 1514, 1524, 1534, and 1544 are appropriately sized to provide an increasing output from the channel B conductor 1560 as the pen is moved downwardly from the area of coil 1510 to the coil 1540. As the pen is moved vertically upwardly in the Y direction, from the coil 1540 towards the coil 1510, the output from the A channel conductor 1550 increases, and the output from the B channel conductor 1560 decreases correspondingly.

As the pen moves vertically downwardly in the Y direction from the coil 1510 towards the coil 1540, the output from the B channel conductor 1560 increases, and there is a corresponding decrease in the output of the A channel conductor 1550. When two arrays, such as the Y array 1500 and an X array (not shown) are used with appropriate pen apparatus, the location of the pen is sensed, as generally discussed above, from the two A and B conductor outputs for each X and Y coil array.

While the circuitry of FIG. 16 has been discussed herein in terms of the sense coil apparatus of FIGS. 13-15, the principles of the circuitry also apply to the other sense coil apparatus of FIGS. 17-19. The output signals from the sense coils of a writing surface, for both X and Y sense coils, comprise amplitude signals. The respective amplitude signals are added and subtracted to obtain the sum and delta signals. The sum and delta signals are then multiplied to obtain a ratiometric signal which is representative of the sum and delta signals, but not a direct function of the absolute amplitude. Rather, the ratiometric output signal is corrected for many input, and therefore also output, variations, such as pen rotation, pen lifting, etc., by the user or operator of the pen. Phase shifting is immaterial with respect to the final ratiometric output signal.

Rather than using a multiplying analog to digital multiplier, as shown in FIG. 16, an A.G.C. (automatic gain control) or an analog multiplier could also be used, if desired.

Since pen location causes an increase and decrease in sense coil output, the amplitude of the output signal is a function of pen location for both X and Y directions. When the two (X and Y) amplitude-related ratiometric output signals are correllated to predetermined signal parameters for discrete locations over the entire writing surface, a specific pen location is designated. This is so regardless of the size of the writing surface. Any given X line location will have a predetermined ratiometric amplitude output, and any given Y line location will also have a predetermined ratiometric amplitude output. Where the two lines cross (correlate) is the pen location.

Continuous output signals may then be made the basis of graphically portraying the pen location, such as when a signal representing a pen location is fed to a graphic printer. The graphic printer then traces the correlated output to reproduce the originating pen's sequential movements. The movements comprise a written record from the originating station which is reproduced by the printer to portray a copy of the original writing.

In digital form, the pen location signal may be fed into the memory of a computer for later extraction and conversion to writing or for other processing in accordance with instructions from a computer program. Data stored in certain locations, corresponding to pen locations, may have a predetermined significance which results in preprogrammed instructions being carried out.

It will be noted that it is the amplitude signal that is the end result of the apparatus of the present invention. The amplitude of the output signals of both the X and the Y sense coils are first determined. The respective X amplitudes and Y amplitudes are then added to and subtracted from each other. The absolute amplitude sum and delta signals are then multiplied to provide a ratio, which ratio is a corrected value of the sum in delta values. When the X and the Y ratiometric values, which represent the amplitude of the detected input fields from the pen, are correlated, a specific X and Y coordinate location is identified. The location represents the location of the pen. Increases and decreases in the output signals of the sense coils of the writing surface are functions of pen location. Hence, the location of the pen is tracked as it writes by the amplitude of the output signals of the X and Y sense coils, as ratiometrically determined.

Figure 20:
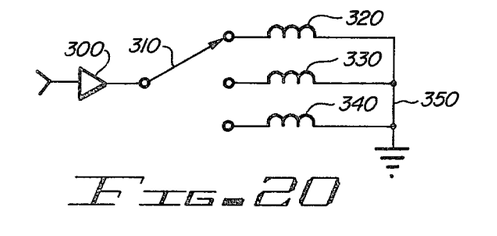
FIG. 20 is an alternate apparatus for providing an input signal from a single driver to three pen coils sequentially.

FIG. 20 comprises a schematic representation of an alternate apparatus for providing an input signal from a single driver to three pen coils sequentially. A single driver 300 is connected to an appropriate switching element 310. The switching element 310 is in turn connected sequentially to coils 320, 330, and 340. The three coils are tied together to a common return conductor 350.

The employment of three amplifiers or drivers for providing input signals to three coils of a pen was discussed above in conjunction with the apparatus of FIG. 7. The apparatus of FIG. 7 in turn represented a schematic illustration of the use or employment of three input coils for the pen apparatus of FIGS. 1-6. The use of two input drivers in conjunction with three coils was discussed above in conjunction with FIG. 8. The employment of a pen apparatus employing two coils, instead of three coils was discussed in conjunction with FIGS. 9-11. In FIG. 12, two input drivers are illustrated as providing the input signals for the two coils illustrated therein.

It was suggested, in the discussion of FIG. 12, that a single driver may sequentially be used to provide input signals to a plurality of pen coils, and such has been illustrated in FIG. 20. Thus, rather than use a plurality of input drivers, with the input signals differing in phase, a single driver may be used to sequentially provide input signals to a plurality of coils, with the input signals spaced apart in a time sequence. Rather than have continuous signals differing in phases fed to a plurality of coils, a single signal is fed in a time sequence relationship to each coil of the plurality of coils.

There are advantages in such time sequencing, such as the elimination of the additive and subtractive effects of different phase signals at the overlap areas of the coils and the elimination of problems concerned with the accuracy of the shift of signals sent to drivers. Furthermore, problems concerned with the signal strength in the overlap areas of the coils are also substantially eliminated.

While FIG. 20 is a simplified schematic illustration, it is obvious that any appropriate, and well known switch apparatus may be utilized to sequentially connect the driver 300 with the coils 320, 330, and 340. The illustration of a simplified switch 310 is accordingly only for illustrative purposes.

The apparatus discussed above comprises embodiments of graphic communications apparatus in which the location of a pen, or other writing or input implement, is sensed by a writing surface, or by sense lines or coils associated therewith. The term "pen" is used herein, but other input devices may also be employed, such as a cursor or a mouse or any object which may be detected by position. With respect to the sense coils associated with a writing surface, the particular implementation used will depend on various parameters, such as the size of the writing surface, cost, signal strength, magnetic characteristics, etc. Moreover, various alternatives to the implementation of coil holders for the writing surface of FIGS. 13-15 are possible, again depending on various parameters. One important parameter is the linearity of the field. The type of pick-up winding, the writing surface, whether metal or non-metal, etc., is selected so as to linearize the field, so that the signal strength increases in a linear manner with increasing proximity to the pen or other input device, rather than having the signal strength increase in a more rapid manner.

The time sharing of the input signal is discussed primarily in conjunction with FIG. 20. It will be appreciated that time sharing is also possible with respect to the output signals from the pick-up wires or coils. For example, two amplifiers are shown in FIG. 16, with their associated circuit elements. However, only a single amplifier, etc., is required if time sharing is implemented. For example, the apparatus may perform the function of reading X direction and outputting data based thereon. Such time sharing may be continued, alternately reading and outputting data from one and then the other. Such time sharing or sequential operation may also be used when two channels of a one direction circuitry are used, such as shown in FIG. 18, with first one channel read and then the other channel read. The information from each reading is appropriately processed, and the combined information is also processed before further readings are made.

Various detectors are usable with the present apparatus, such as diode detectors, peak detectors, or self-referenced synchronous detectors. The apparatus of the present invention is insensitive to phase shifts and accordingly no phase shifting is detected. Accordingly, various types of detectors may be used.

A multiplying analog to digital converter is discussed in conjunction with FIG. 16. Other elements or techniques, such as an automatic gain control or an analog multiplier may also be used. Another usable technique for combining the sum and delta signals is pulse width modulation. The sum signal may be used to modulate the width of a pulse representing the delta signal. The delta signal is fed into a filter and the sum signal is used to vary how much of the delta signal is fed into the filter by modulating its pulse width by appropriately gating by a duty signal controlled by the sum signal. Other methods, such as using a light controlled variable resistor to change and correct the delta signal level, may also be used.

The ratiometic output is based on amplitude, but the amplitude of the signals is used as a means of creating data. The pick-up signals vary in amplitude, and the variations in the signals are used to create data for processing and interpreting. The ratiometric output is based on the signal amplitude, but is amplitude insensitive itself.

It will be noted that tuned circuits are briefly discussed with respect to various embodiments of sense or pick-up coils. The coils may or may not be tuned. In some instances the tuning of the coils may result in the coils talking to each other, which is undesirable. A signal may be picked up and re-radiated to create spurious data. Such a situation is to be avoided.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Graphic communication apparatus, comprising, in combination:
   a writing surface;
   pen means movable on the writing surface for graphically portraying information on the writing surface;
   input signal means for providing an input signal to the pen means;
   pen coil means, including a plurality of pen coils, disposed in the pen means for producing a magnetic field in response to the input signal as the pen moves on the writing surface;
   sense coil means for sensing the magnetic field produced by the pen coil means and for producing output signals in response thereto, including
      X direction sense coil means for sensing the magnetic field produced by the pen coil means in an X direction, and
      Y direction sense coil means for sensing the magnetic field produced by the pen coil means in a Y direction; and
   circuitry means connected to the sense coil means for receiving the output signal from the sense coil means and for producing an output signal representative of the location of the pen means on the writing surface.

2. The apparatus of claim 1 in which the X direction sense coil means comprises
   a first X direction coil, and
   a second X direction coil spaced apart from and aligned generally parallel to the first X direction coil.

3. The apparatus of claim 1 in which the X direction sense coil means includes
   a plurality of X direction coils spaced apart from and disposed substantially parallel to each other.

4. The apparatus of claim 3 in which each coil of the plurality of X direction coils includes the same number of turns.

5. The apparatus of claim 4 in which each coil of the plurality of X direction coils of the X direction sense coil means includes a first conductor for providing a first output signal and a second conductor for providing a second output signal.

6. The apparatus of claim 5 in which the plurality of X direction coils of the X direction sense coil means includes a first plurality of resistors connected to the first conductor and a second plurality of resistors connected to the second conductor, and each resistor of the first and second pluralities of resistors is selected to provide a different output signal on the first and second conductors from each coil of the plurality of X direction coils in response to the location of the pen means relative to any one coil of the plurality of X direction coils.

7. The apparatus of claim 3 in which each coil of the plurality of X direction coils comprises a plurality of serially connected discrete coils, with adjacent coils having a different number of turns in a predetermined order.

8. The apparatus of claim 1 in which each coil of the plurality of pen coils comprises two half coils spaced apart from each other and wound in the same direction.

9. The apparatus of claim 8 in which a plurality of pen coils comprise a first pen coil, having a first pen coil half and a second pen coil half, and a second pen coil, also having a first pen coil half and a second pen coil half.

10. The apparatus of claim 9 in which the first pen coil half of the first pen coil overlaps the first and second pen coil halves of the second pen coil, and the second pen coil half of the first pen coil also overlaps the first and second pen coil halves of the second pen coil.

11. The apparatus of claim 10 in which the pen means includes means for providing an input signal to the pen coil means.

12. The apparatus of claim 11 in which the means for providing an input signal to the pen coil means includes means for providing a first input signal to the first pen coil and a second input signal to the second pen coil means ninety degrees after the first input signal.

13. The apparatus of claim 1 in which the pen coil means further includes a coil form on which the pen coils are wound.

14. The apparatus of claim 13 in which the coil form of the pen coil means includes a longitudinal axis, and the pen coils are wound generally parallel to the longitudinal axis.

15. The apparatus of claim 14 in which the pen means includes a generally cylindrical housing and the coil form of the pen coil means is disposed in the cylindrical housing.

16. The apparatus of claim 1 in which the X direction sense coil means includes means for producing a first and a second X direction output signal, and the Y direction sense coil means includes means for producing a first and a second Y direction output signal.

17. The apparatus of claim 16 in which the circuitry means includes means for sensing the amplitude of the first and second X direction and Y direction output signals.

18. The apparatus of claim 17 in which the circuitry means further includes means for adding and subtracting the first and second X direction output signals and the first and second Y direction output signals to provide a sum and a delta output from the X direction output signals and from the Y direction output signals.

19. The apparatus of claim 18 in which the circuitry means further includes means for multiplying the X direction and Y direction sum and the delta outputs to provide a ratio for the X direction output signals and for the Y direction output signals.

20. The apparatus of claim 1 in which the pen coil means includes a plurality of pen coils, and the input signal means includes means for sequentially providing an input signal to each pen coil of the plurality of pen coils.

* * * * *